Feb. 24, 1970 W. H. WARD 3,497,015
PRESSURE CONTROLLED WEIGHT TRANSFER HITCH
Original Filed Sept. 8, 1964 3 Sheets-Sheet 1
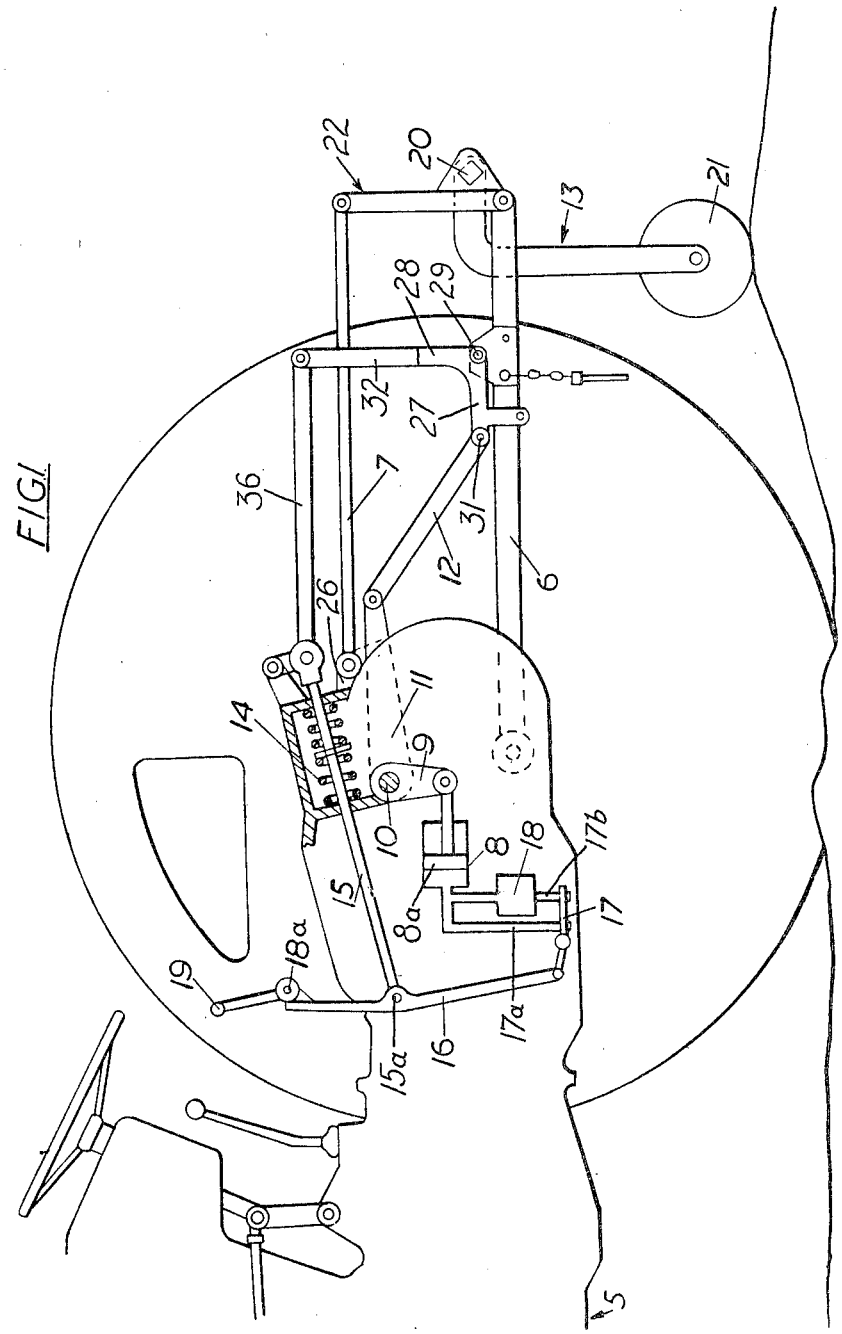
Inventor
WALTER HENRY WARD
BY Tweedale & Gerhardt
Attorneys

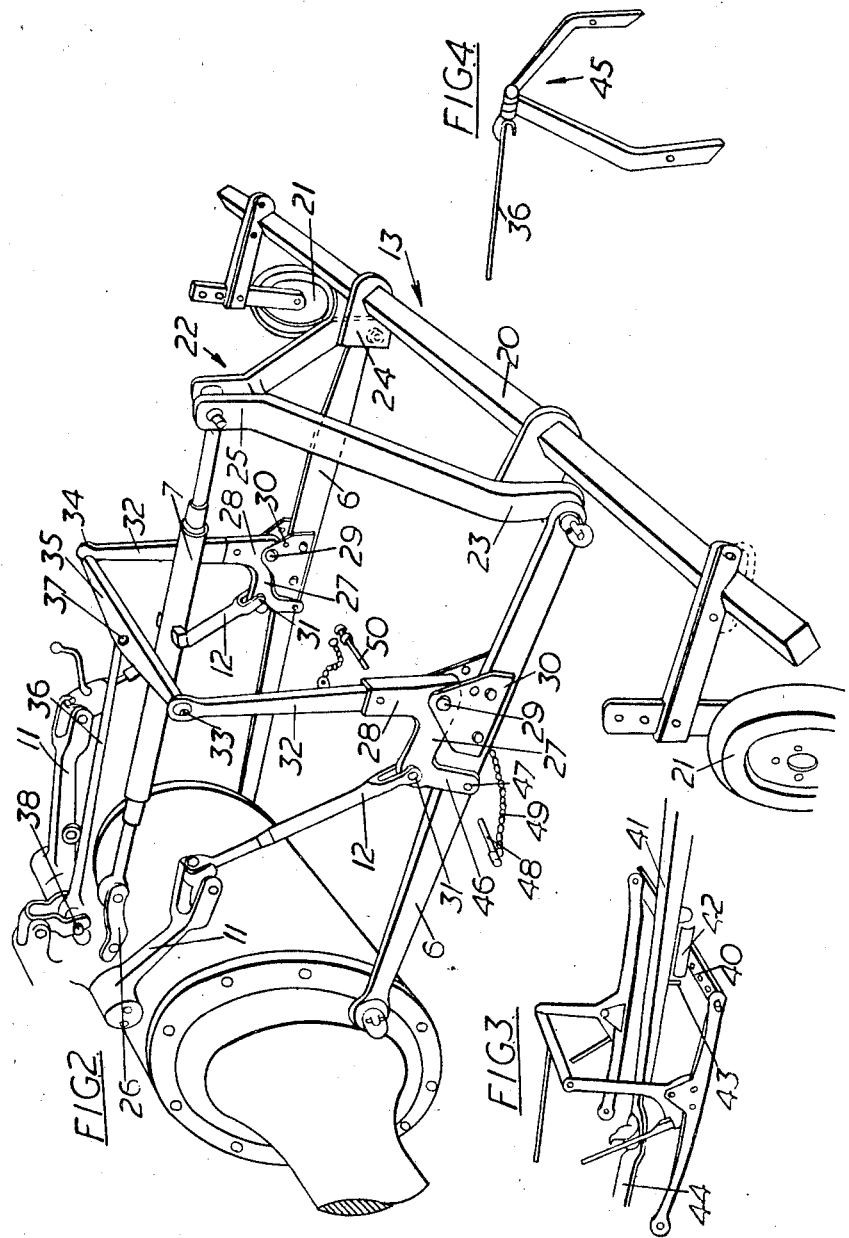

Feb. 24, 1970        W. H. WARD        3,497,015
PRESSURE CONTROLLED WEIGHT TRANSFER HITCH
Original Filed Sept. 8, 1964        3 Sheets-Sheet 3
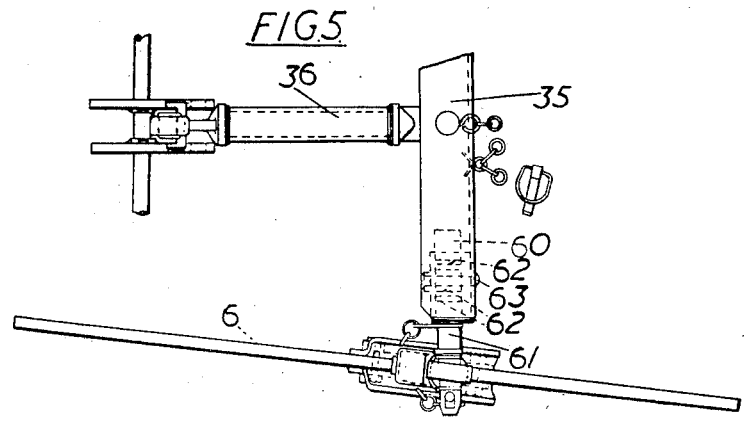
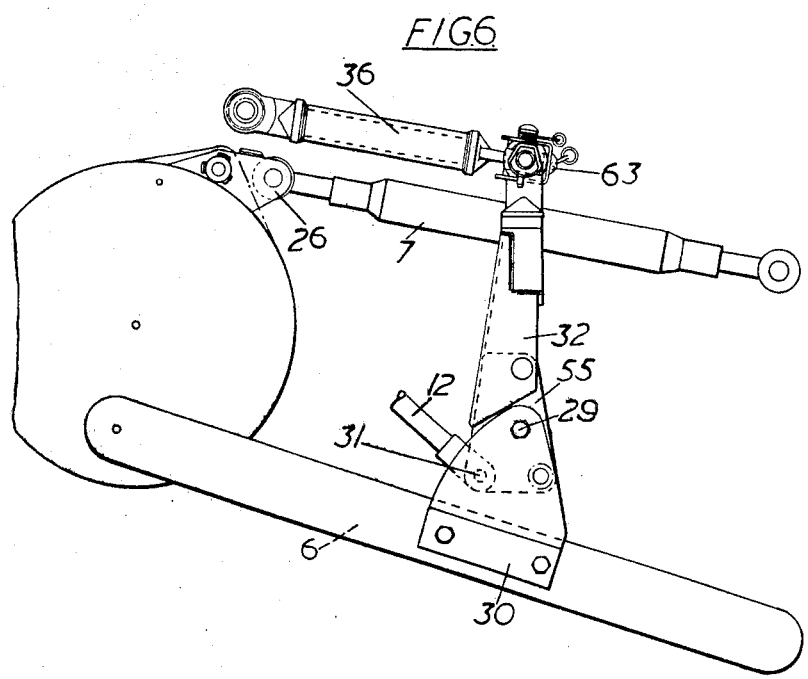
Inventor
WALTER HENRY WARD
BY Tweedale & Gerhardt
Attorneys

# United States Patent Office 3,497,015
Patented Feb. 24, 1970

3,497,015
PRESSURE CONTROLLED WEIGHT
TRANSFER HITCH
Walter H. Ward, Vereeniging, Republic of South Africa,
assignor to South African Farm Implement Manufacturers Limited, Vereeniging, Republic of South Africa
Continuation of application Ser. No. 394,785, Sept. 8,
1964. This application Sept. 26, 1966, Ser. No. 582,168
Claims priority, application Great Britain, Sept. 11, 1963,
35,757/63
Int. Cl. A01b 63/14, 59/043, 65/00
U.S. Cl. 172—7
9 Claims

ABSTRACT OF THE DISCLOSURE

A hitch mechanism, for a tractor with a pair of lower draft links, drop links for raising and lowering the draft links, and an automatic draft control mechanism which includes a bell crank lever pivotally connected to each draft link, one arm of each bell crank lever attached to each drop link, a cross member universally jointed to the other arms of each bell crank lever and a sensing member universally joined at one end to the cross member and connected at the other end to the tractor.

This application is a continuation of application Ser. No. 394,785 filed Sept. 8, 1964; which is now abandoned.

This invention relates to hitch mechanism for attaching devices to a tractor, and more particularly to hitch mechanisms for attaching implements or trailed vehicles to a tractor.

In my earlier United States Patent 3,116,939 dated Jan. 7, 1964, a hitch linkage is shown that provides for downward transfer of force to the tractor rear wheels while at the same time allowing lateral tilting of a wide hitch implement relative to the tractor without placing large twisting stresses on the implement or hitch linkage. In the arrangement shown in the above mentioned patent, the normal automatic draft control is operative to raise and lower the implement to maintain relatively constant draft force as measured by the compression or tension on the conventional top link of the "Ferguson" three-point hitch. While operating on relatively level ground the weight transfer to the tractor compared to that carried by the wide implement gauge wheels is relatively constant and can be varied only by relocating and adjusting the hitch linkage levers. When the tractor pitches relative to the implement, this weight transfer will vary. Furthermore, the maximum weight transfer is limited when a major portion of the implement weight is carried on gauge wheels and is also dependent on large soil reaction or suction forces being present to react through the top link to the tractor. In certain trailed type vehicles such as wide planters, there are little or no soil reaction forces available for weight transfer.

The present invention concerns itself with providing a hitch linkage similar to that shown in Patent No. 3,116,939 which can be used in the same manner as shown in that patent but can also be used to provide a constant weight transfer to the tractor as determined by the operator. Furtheermore, the proportion of implement weight carried by ground engaging wheels and the tractor rear wheels can also be varied at will, and will remain constant regardless of the pitching of the tractor.

In general the present invention provides for utilizing the automatic draft control mechanism of the tractor to provide a constant pressure, as predetermined by the operator, in the lift ram that acts to raise the lower draft links. The full lateral flexibility of the linkage is maintained to accommodate uneven ground forces encountered by the ground engaging wheels to permit the implement or other trailed device to tilt relative to the tractor.

It is, therefore, an object of this invention to provide a hitch linkage for connecting an implement to a tractor whereby the implement weight transfer to the tractor can be adjusted at will, and once adjusted will remain constant.

It is a further object of this invention to provide a hitch that provides for adjustable weight transfer to the tractor and allows lateral tilting of the implement relative to the tractor.

Still another object is to provide a hitch linkage that will allow the normal automatic draft control on the tractor to be used in obtaining an adjustable, but constant transfer of weight to the tractor from the implement.

An additional object is to provide such a hitch that can easily be changed from a draft control arrangement to a cons'ant, but adjustable, weight transfer arrangement.

The foregoing, and other objects and advantages will be readily apparent from the following description taken in connection with the accompanying drawings in which:

FIG. 1 is a fragmentary diagrammatic side elevation of a tractor and unit mounted implement coupled by a hitch mechanism according to the invention and showing the tractor draft control mechanism;

FIG. 2 is a rear perspective view of the hitch mechanism and implement of FIG. 1;

FIG. 3 is a rear perspective view of the hitch mechanism adapted for hitching a trailed implement or vehicle to a tractor;

FIG. 4 is a rear perspective view of a modification of the hitch frames; and

FIGS. 5 and 6 are plan and elevational views, respectively, of a commercial embodiment of the hitch mechanism.

With reference to FIGS. 1 and 2, reference numeral 5 designates a tractor having a hydraulically controlled, three-point hitch linkage of the "Ferguson" type including a pair of laterally spaced, lower draft links 6 pivotally connected to thte rear axle casing of the tractor by universal joints, and a control or upper link 7. Control link 7 is connected at its forward end to a fixed bracket on the rear axle frame by universal joints at a point approximate mid-way between the draft links 6 and spaced vertically above the draft links.

Draft links 6 are raised and lowered hydraulically by means of a hydraulic ram in the form of a cylinder 8 in which is reciprocaily mounted a single acting piston 8a. Piston 8a is pivotally connected with a lever arm 9 fixed to a cross-shaft 10 rotatable journalled in the axle casing.

Non-rotatably mounted on cross-shaft 10 is a pair of lift arms 11 having their free ends pivotally attached to drop links 12 which in turn are interconnected with the draft links in a manner to be described hereinafter.

Hydraulic fluid in cylinder 8 acts against piston 8a to maintain a constant proportion of the weight of an implement indicated generally at 13 on the rear wheels of tractor 5 in a manner to be set forth below.

The hydraulic ram 8, 8a is controlled by a control rod 15 connected with a double-acting control spring 14 and having its end pivotally connected at 15a to a floating lever 16. Lever 16 is pivotally interconnected at its lower end with a control valve 17 of a pump 18 which delivers hydraulic fluid to cylinder 8. Lever 16 engages at its upper end a cam 18a on a hand lever 19. Cam 18a may be rotated by means of hand lever 19 to set the position of the upper end of lever 16 and determine the initial volume of hydraulic fluid in cylinder 8 and fix the position of draft links 6 above the ground.

Valve 17 controls both the outlet 17a from cylinder 8 and the inlet 17b to pump 18 which supplies hydraulic oil to the piston-cylinder arrangement 8, 8a. Movement of valve 17 toward the right in FIG. 1 blocks inlet 17b and opens outlet 17a. Conversely, movement of valve 17 to the left in FIG. 1 blocks outlet 17a and opens inlet 17B causing the pump to supply hydraulic oil to cylinder 8. In its center or neutral position, valve 17 blocks both inlet 17b and outlet 17a.

In the embodiment of FIGS. 1 and 2, implement 13 is a unit-mounted implement having a wide tool bar 20 to which soil working tools may be attached. Ground engaging wheels 21 are mounted at each end of tool bar 20 and the tool bar in turn is mounted in an A-frame 22, the lower ends 23 and 24 of which are pivotally connected to draft links 6, and the upper end or apex 25 of which is connected pivotally to control link 7. For normal draft control operation, control link 7 would act on control rod 15 instead of being pivotally connected to the stationary bracket 26 on the tractor frame as shown. In the present case, however, control link 7 acts as a spacing and stabilizing member which fixes the distance between the tractor and apex 25 of A-frame 22 and prevents rotation of the implement about its points of pivotal connection with draft links 6 and control link 7.

Secured to each draft link 6 intermediate its ends is a bracket 30 on which is pivotally fulcrumed at 29 a lever, preferably in the form of a bell crank, having a generally forwardly extending arm 27 and a generally upwardly projecting arm 28. Arms 27 of the bell crank levers are pivotally connected at 31 to drop links 12, and arms 28 are secured to upright extensions 32 projecting above the level of control link 7. Extensions 32 have their upper ends universally jointed at 33 and 34 to a cross-piece or member 35. Cross-piece 35 is connected with control rod 15 by means of a sensing member 36 having its forward end 38 universally connected to the rear end of control rod 15 and its rear end connected universally to the center of cross-piece 35. Levers 27, 28, together with extensions 32 and cross-piece 35 constitute a hitch frame which can pivot in a fore and aft direction about pivot points 29 on brackets 30.

With hand lever 19 set in a selected position to determine the proportion of the weight of implement 13 to be transferred to the tractor, the weight of implement 13 tends to force draft links 6 downwardly. As a result of the downward force on draft links 6, bell crank levers 27, 28 will tend to swing downwardly about pivot 31 and rearwardly or clockwise about pivot 29 which movement will be transferred through extensions 32 and cross-piece 35 to pull sensing member 36 toward the rear, that is to tension member 36. Sensing member 36 in turn will pull rod 15 toward the rear shifting valve 17 to the right to decrease the amount of hydraulic fluid in cylinder 8 thus lowering lift arms 11, drop links 12, and draft links 6 to a position determined by the position of hand lever 19.

In this "neutral" position, control spring 14 is in the "tension range," that is the control rod 15 is in tension, the rear portion of spring 14 is compressed, and the forward portion of spring 14 is allowed to expand. Thus an increase in the vertical load on draft links 6 increases the compression of the rear portion of the spring while a decrease in the vertical load tends to permit the spring to return to its equilibrium position in which the front and rear portions of spring 14 are equalled stressed.

In the "neutral" position established by the poition of hand lever 19, a lifting force is exerted on draft link 6 by lift arms 11 and drop links 12 in opposition to the weight of implement 13, which lifting force is transferred to the rear wheels of the tractor at all times. This lifting force determines the proportion of the weight of the implement that is carried by the tractor and removed from gauge wheels 21 of implement 13. If the tractor moves over a rise in the ground so that the tractor is at a higher level than the implement, the downward force on draft links 6 due to the weight of the implement 13 will increase resulting in rearward or clockwise pivotal movement of bell cranks 27 and 28 about pivot 29 which in turn acts through sensing member 36 to pull control rod 15 rearwardly and increase the compression in the rear portion of control spring 14 and transmit a "lower" signal to cylinder 8, and the amount of hydraulic oil in cylinder 8 will be decreased resulting in lowering of draft links 6 until the "neutral" position is restored.

Conversely, if implement 13 rises relative to the tractor, the downward force on draft links 6 will decrease resulting in forward or counter-clockwise pivoting of bell crank levers 27, 28 about pivot 29 and forward movement of sensing member 36. Control rod 15 is thus pushed towards the left in FIG. 1 tending to restore control spring 14 to its equilibrium position and transmitting a "raise" signal to cylinder 8 to increase the amount of hydraulic fluid in cylinder 8 thus raising draft links 6 until the pre-established neutral position is again restored.

If, as shown in FIGS. 1 and 2, implement 13 is wide relative to the spacing of draft links 6, lateral tilting may occur due to unevenness of the ground at each side of the implement. If the left hand wheel 21 of implement 13, as viewed from the rear in FIG. 2, comes to a dip in the ground, and the right hand wheel comes to a corresponding rise, more weight will be supported by the left hand draft link 6 which will thus tend to move downwards causing rearward pivotal movement of the left hand bell crank lever 27, 28 about its pivot 29 and corresponding rearward movement of the upper end of its extension 32. However, since the right hand draft links is raised by a corresponding amount, the right hand bell crank lever 27 and 28 will pivot forwardly about its pivot 29 causing corresponding forward movement of the upper end of its extension 32. By virtue of the universal joints at 33, 34 and 37, cross-piece 35 will swivel about joint 37 and no signal will be transmitted through sensing member 36 to control rod 15.

If the left hand wheel 21 of the implement, as viewed in FIG. 2, comes to a dip or hollow and the right hand wheel 21 remains at the same level, weight is added to the left hand draft link 6 but no weight is removed from the right hand draft link 6. As a consequence, a resultant increase in the weight carried by draft links 6 occurs and the end 33 of the left hand extension 32 pivots rearwardly while end 34 of the right hand extension 32 remains stationary. There is therefore a resultant rearward movement of sensing element 36 and control rod 15. The lateral movement transmits a "lower" signal to cylinder 8 so that both draft links 6 tend to lower. Since the right hand links 6 is in engagement with the ground, the implement in effect lowers in an arc about the right hand wheel 21 until cross-piece 35 is parallel to the inclination of the ground.

In the same way, if implement 13 is pivoted toward the right as viewed from the rear in FIG. 2, draft links 6 would be lowered in an arc about the left hand ground engaging wheel 21. Thus, in any tilted position, the lift control mechanism is actuated to compensate for tilting and for maintaining the proper weight distribution between the implement and the rear wheels of the tractor with no harmful stresses in the hitch linkage.

In the embodiment of FIG. 3, the hitch mechanism is shown as adapted for use in transferring weight from a trailed vehicle or implement as opposed to the unit mounted implement illustrated in FIGS. 1 and 2. In the embodiment of FIG. 3, control link 7 is removed and draft links 6 are interconnected by a link 40. Draw bar 41 of the implement is provided with a roller 42 extending longitudinally of the draw bar and depending from brackets 43 beneath draw bar 41. Draw bar 41 is in turn coupled to the tractor hitch hook 44 and is free to swing laterally of the tractor to facilitate turning.

If lateral tilting of the trailed vehicle occurs due to unevenness of the ground, draw bar 41 rolls along link 40 toward one or the other sides and the resultant movement of draft links 6 transmits appropriate "raise" or "lower" signals to cylinder 8 in the same way as for the unit-mounted implement of FIGS. 1 and 2.

The arrangement of the bell crank levers is such that the deflection of arms 28 from a substantially upright position provides a rough indication of the proportion of the weight of the implement carried by draft links 6 and transferred to the tractor. Thus if the weight transfer is considerable, arms 28 and extensions 32 will be inclined to the right in FIG. 1; if the weight transfer is small, that is, if most of the weight of the implement is being carried by the wheels 21, arms 28 and extensions 32 will be inclined to the left in FIG. 2.

Where the hitch mechanism is not to be used with wide implements, extensions 32 and cross-piece 35 may be replaced by a simple hinged frame 45 as shown in FIG. 4.

Provision is made for disabling the hitch mechanism and reverting to normal draft control through the draft links 6 and control link 7. For this purpose the downwardly extending forked extension 46 at the forward end of the arm 27 of each bell crank lever is fitted over the associated draft link 6 with one prong of the fork on each side of the link. Holes 47 are provided in the fork prongs, and a pin 48 may be fitted through these holes so as to pass beneath the draft link 6 and secure the bell crank lever 27, 28 to the draft link 6. Pin 48 is secured to bracket 30 on the draft link by a chain 49 as a precaution against loss of the pin 48. The extensions 32, cross-piece 35 and sensing member 36 are then removed, and the forward end of control link 7 is disconnected from bracket 26 and connected to the rear end of control rod 15. Removal of each extension 32 is effected by withdrawing a pin 50 from engagement with holes in arm 28 of the bell crank lever and in the foot of extension 32.

In the embodiment shown in FIGS. 5 and 6, parts similar to those shown in FIGS. 1 to 4 are designated by the same numerals. The bell crank lever 55 is slightly modified and does not include the forked extensions 46 by means of which reversion to normal draft control is possible. In addition, provision is made for altering the length of cross-piece 35. Thus each end of the cross-piece is provided with an axial socket 60 adapted to slidably receive a pin 61 carried at the upper end of the associated extension 32. A diametral hole is provided in the cross-piece 35 and the pin 61 has a series of spaced diametral holes 62. Thus a bolt 63 may be passed through the diametral hole in the cross-piece 35 and a selected one of the holes in the pin 62 so as to vary the spacing between the draft links 6. In a modification the above arrangement may be provided at one end only of the cross-piece 35.

When used in combination with wide implements use of the hitch mechanism is not restricted to implements having ground-enaging wheels 21. Instead the implement may be fitted, for example, with ground engaging skids.

Moreover, though in the specific embodiment described with reference to the drawings the tractor is provided with a three-point hitch linkage, use of the hitch mechanism is not confined to a tractor having such a linkage; the hitch mechanism may instead be used in combination with a tractor having a two-point hitch linkage since the control link 7 is used only as a stabilizing link when the implement is unit-mounted.

In a further modification the pin 48 may pass through a hole in the draft link 6 instead of passing beneath the link, the forked extensions in this case being shorter than those shown in the embodiment.

I claim:

1. In a tractor having draft control mechanism including a movable control element and power lift means pivotally movable about an axis transverse to the longitudinal axis of the tractor in response to movement of the control member, a pair of rearwardly extending draft links pivotally connected at one end to the tractor, a pair of levers, one of said pair of levers being fulcrumed intermediate its ends on each of said draft links, a pair of drop links each having one end pivotally connected with one end of one of said levers and its other end pivotally connected with the power lift means and means pivotally connecting the other ends of said levers with said control element for actuating the power lift arm in response to variations in the weight carried by said draft links.

2. The construction defined in claim 1 wherein said means connecting the other ends of said lever with the control element includes a cross-piece universally connected with the other ends of the levers, and a sensing member having one end universally connected with the control element and its other end universally connected with said cross-piece intermediate the ends of said cross-piece.

3. The construction defined in claim 2 further including a transverse link pivotally connected between the free, trailing ends of the draft links, a drawbar pivotally connected at one end to the tractor and extending across said transverse link, and a roller mounted on the lower side of said drawbar intermediate its ends for supporting the drawbar on said transverse links.

4. The construction defined in claim 2 further including an extension member located on each of said levers at a point spaced from the fulcrum connectible with the associated draft link for optionally securing the lever against rotation relative to the draft link.

5. The construction defined in claim 2 further including an implement carrying A-frame having its lower ends pivotally connected with the free trailing ends of the draft links, and a control link having one end pivotally secured at a fixed point on the tractor frame and its other end pivotally secured to the upper end of said A-frame.

6. The construction claimed in claim 1 wherein said interconnecting means includes a cross-member universally mounted at each end to respective ones of said levers, and a rigid sensing link having one end universally connected to the cross-member intermediate the ends of said cross-member, and having the other end of said sensing link universally connected to said draft control mechanism.

7. A hitch mechanism for attaching an implement to a tractor, the tractor including a rear axle casing, a pair of spaced lower draft links with their forward ends pivotally connected to the rear axle casing and having means at their rear ends for attaching an implement to the tractor, a pair of lift arms each having one free end, drop links pivotally attached to the free end of each lift arm, and an automatic draft control mechanism, the hitch mechanism including a bell crank pivotally connected to each lower draft link at a point intermediate the ends of said draft link, means pivotally connecting one arm of each bell crank to one of the drop links, and means, independent of any implement which may be attached to the tractor, for connecting another arm of each bell crank to said automatic draft control mechanism whereby said draft control mechanism will measure the weight placed upon the draft links by an implement and move the lift arms to regulate the weight on said draft links and thereby regulate the weight transferred to the tractor from an implement.

8. The hitch mechanism of claim 7 wherein each of said bell cranks is pivotally fulcrumed on the draft links about a point intermediate the two arms of each bell crank.

9. The hitch mechanism of claim 7 wherein the means for connecting another arm of each bell crank to said automatic draft control mechanism includes a cross-member universally joined at each end to respective bell cranks and a sensing member universally joined to a point midway along the cross-member and connected to the draft control mechanism.

References Cited

UNITED STATES PATENTS

| | | | |
|---|---|---|---|
| 3,073,622 | 1/1963 | Merritt | 280—405 |
| 3,095,933 | 7/1963 | Bunting | 172—7 XR |
| 3,098,528 | 7/1963 | Richey et al. | 172—7 |
| 3,167,133 | 1/1965 | Annat | 172—7 |
| 3,173,496 | 3/1965 | Annat | 172—7 XR |
| 3,198,547 | 8/1965 | Annat | 172—7 XR |
| 3,214,189 | 10/1965 | Annat | 172—2 XR |
| 2,663,239 | 12/1953 | Rapp et al. | 172—10 |
| 3,025,915 | 3/1962 | Kelly | 172—445 |
| 3,047,076 | 7/1962 | Wier et al. | 172—447 X |
| 3,116,939 | 1/1964 | Ward | 172—439 X |

U.S. Cl. X.R.

172—445, 465; 280—406